US008547894B2

(12) United States Patent
Seyama (10) Patent No.: US 8,547,894 B2
(45) Date of Patent: *Oct. 1, 2013

(54) PILOT SIGNAL TRANSMITTING METHOD, BASE STATION, MOBILE STATION AND CELLULAR SYSTEM TO WHICH THE METHOD IS APPLIED

(71) Applicant: Fujitsu Limited, Kawasaki (JP)

(72) Inventor: Takashi Seyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/724,304

(22) Filed: Dec. 21, 2012

(65) Prior Publication Data

US 2013/0114499 A1    May 9, 2013

Related U.S. Application Data

(63) Continuation of application No. 12/560,540, filed on Sep. 16, 2009, now Pat. No. 8,363,588, which is a continuation of application No. PCT/JP2007/000298, filed on Mar. 26, 2007.

(51) Int. Cl.
*H04H 20/71* (2008.01)

(52) U.S. Cl.
USPC ............................................. 370/312

(58) Field of Classification Search
USPC .............................. 370/312, 324, 343
See application file for complete search history.

(56) References Cited

U.S. PATENT DOCUMENTS

| 7,099,265 B2 * | 8/2006 | Kuwabara et al. ............ 370/203 |
| 8,363,588 B2 * | 1/2013 | Seyama ........................ 370/312 |
| 2007/0047483 A1 * | 3/2007 | Khan ............................ 370/328 |
| 2009/0028258 A1 * | 1/2009 | Ma et al. ....................... 375/260 |

FOREIGN PATENT DOCUMENTS

| JP | 2006-311359 | 11/2006 |
| WO | 2006/102746 | 10/2006 |

OTHER PUBLICATIONS

International Search Report for corresponding International PCT Application No. PCT/JP2007/000298, with a mail date of Jun. 5, 2007.

3GPP TR 25.814 V7.0.0 (Jun. 2006); Technical Report; 3rd Generation Partnership Project; Technical Specification Group Radio Access Network; "Physical layer aspects for evolved Universal Terrestrial Radio Access (UTRA)"; (Release 7) Dated Jun. 2006.

(Continued)

*Primary Examiner* — Mark Rinehart
*Assistant Examiner* — Mohammad Anwar
(74) *Attorney, Agent, or Firm* — Myers Wolin, LLC (57) ABSTRACT

A transmitting method in a mobile communication system, which has a base and mobile station that performs radio communication with the base station in a cell of a radio communication area formed by the base station, and mixes, allocates unicast data and broadcast/multicast data to subframes in a radio frame, and transmits the radio frame as downstream data from the base station to the mobile station, by the base station, multiplexing cell-specific pilot signals corresponding to the unicast data to a first subframe to where data is allocated, while multiplexing cell-specific pilot signals to a second subframe to where data is allocated, where the number of the cell-specific pilot signals allocated to the second subframe is different from the number of the cell-specific pilot signals allocated to the first subframe; setting a difference between the various start phase of cell-specific pilot signals transmitted in the various subframes.

9 Claims, 11 Drawing Sheets

(56) References Cited

OTHER PUBLICATIONS

3GPP TSG RAN WG1#44bis, Athens, Greece; LG Electronics; Agenda Item: 10.1.2; "Multiplexing of multi-cell MBMS and unicast transmission"; Document for: Decision; R1-060917; Dated Mar. 21, 2006; [Ref.: International Search Report dated Jun. 5, 2007] [URL: http://www.3gpp.org/ftp/tsg_ran/WG1_RL1/TSGR1_44bis/Docs/R1-060917.zip>full text].

3GPP TSG RAN WG1 #44 bis, Athens, Greece; Fujitsu; "Initial cell search procedure and long-CP sub-frame structure"; Agenda item: 10.1.3 Cell search (including discussion on PCH and BCH L1 aspects); Document for: Discussion; R1-060970; Dated Mar. 21, 2006; [Ref.: International Search Report dated Jun. 5, 2007] [URL: http://www.3gpp.org/ftp/tsg_ran/WG_RL1/TSGR1_44bis/Docs/R1-060970.zip>full text].

3GPP TSG RAN WG1#44, Denver, USA; Texas Instruments; "Multiplexing of Unicast Pilot and Control Channels in E-MBMS for EUTRA Downlink"; Agenda Item: 13.1.3; Document for: Discssion-Decision; R1-060372; Dated Feb. 13-17, 2006.

3GPP TSG RAN WG1 #44, Denver, USA; Fujitsu; "Channel Design and Long CP Sub-frame Structure for Initial Cell Search"; Agenda item: 13.1.3 Remaining downlink issues; Document for: Discussion; R1-060563; Dated Feb. 13-17, 2006.

3GPP TSG RAN WG1 Meeting #47, Riga, Latvia; NTT DoCoMo, Institute for Infocomm Research, Mitsubishi Electric, Panasonic, Toshiba Corporation; "Three-Step Cell Search Method for E-UTRA"; Agenda Item: 6.3.2; Document for: Discussion and Decision; R1-063304; Dated Nov. 6-10, 2006.

3GPP TSG-RAN WG1 Meeting #47bis, Sorrento, Italy; Nokia; "Reference Signals for Mixed Carrier MBMS"; Agenda Item 6.6.1; Document for: Discussion; R1-070383; Dated Jan. 15-19, 2007.

Office Action issued for corresponding Canadian Patent Application No. 2,681,590 dated May 8, 2012.

First Notification of Office Action issued for corresponding Chinese Patent Application No. 200780052233.4 dated Jun. 5, 2012 with English translation.

Non-Final Office Action issued by the United States Patent & Trademark Office for corresponding U.S. Appl. No. 12/560,540, dated Dec. 8, 2011.

Final Office Action issued by the United States Patent & Trademark Office for corresponding U.S. Appl. No. 12/560,540, dated Jun. 28, 2012.

Office Action issued for corresponding Canadian Patent Application No. 2,681,590, dated May 8, 2012.

Office Action issued for corresponding Chinese Patent Application No. 200780052233.4, issued Jun. 5, 2012, with English translation.

* cited by examiner

| SUB-FRAME | SLOT NO. | PILOT NO. IN SLOT | CASE 1 SUB-FRAME | CASE 1 PHASE OF CELL-SPECIFIC SCRAMBLE CODE | CASE 2 SUB-FRAME | CASE 2 PHASE OF CELL-SPECIFIC SCRAMBLE CODE |
|---|---|---|---|---|---|---|
| 0 | 0 | 1 | UNICAST | 0 | UNICAST | 0 |
|   |   | 2 |   | $N_p$ |   | $N_p$ |
|   | 1 | 1 |   | $2N_p$ |   | $2N_p$ |
|   |   | 2 |   | $3N_p$ |   | $3N_p$ |
| 1 | 2 | 1 | UNICAST | $4N_p$ | MBMS | $4N_p$ |
|   |   | 2 |   | $5N_p$ |   |   |
|   | 3 | 1 |   | $6N_p$ |   |   |
|   |   | 2 |   | $7N_p$ |   |   |
| 2 | 4 | 1 | UNICAST | $8N_p$ | UNICAST | $5N_p$ |
|   |   | 2 |   | $9N_p$ |   | $6N_p$ |
|   | 5 | 1 |   | $10N_p$ |   | $7N_p$ |
|   |   | 2 |   | $11N_p$ |   | $8N_p$ |
| 3 | 6 | 1 | UNICAST | $12N_p$ | UNICAST | $9N_p$ |
|   |   | 2 |   | $13N_p$ |   | $10N_p$ |
|   | 7 | 1 |   | $14N_p$ |   | $11N_p$ |
|   |   | 2 |   | $15N_p$ |   | $12N_p$ |
| 4 | 8 | 1 | UNICAST | $16N_p$ | MBMS | $13N_p$ |
|   |   | 2 |   | $17N_p$ |   |   |
|   | 9 | 1 |   | $18N_p$ |   |   |
|   |   | 2 |   | $19N_p$ |   |   |
| 5 | 10 | 1 | UNICAST | $20N_p$ | UNICAST | $14N_p$ |
|   |   | 2 |   | $21N_p$ |   | $15N_p$ |
|   | 11 | 1 |   | $22N_p$ |   | $16N_p$ |
|   |   | 2 |   | $23N_p$ |   | $17N_p$ |
| 6 | 12 | 1 | UNICAST | $24N_p$ | UNICAST | $18N_p$ |
|   |   | 2 |   | $25N_p$ |   | $19N_p$ |
|   | 13 | 1 |   | $26N_p$ |   | $20N_p$ |
|   |   | 2 |   | $27N_p$ |   | $21N_p$ |
| 7 | 14 | 1 | UNICAST | $28N_p$ | UNICAST | $22N_p$ |
|   |   | 2 |   | $29N_p$ |   | $23N_p$ |
|   | 15 | 1 |   | $30N_p$ |   | $24N_p$ |
|   |   | 2 |   | $31N_p$ |   | $25N_p$ |
| 8 | 16 | 1 | UNICAST | $32N_p$ | UNICAST | $26N_p$ |
|   |   | 2 |   | $33N_p$ |   | $27N_p$ |
|   | 17 | 1 |   | $34N_p$ |   | $28N_p$ |
|   |   | 2 |   | $35N_p$ |   | $29N_p$ |
| 9 | 18 | 1 | UNICAST | $36N_p$ | UNICAST | $30N_p$ |
|   |   | 2 |   | $37N_p$ |   | $31N_p$ |
|   | 19 | 1 |   | $38N_p$ |   | $32N_p$ |
|   |   | 2 |   | $39N_p$ |   | $33N_p$ |

| SUB-FRAME NO. | SLOT NO. | PILOT NO. IN SLOT | 1200 SUBCARRIER PHASE OF CELL-SPECIFIC SCRAMBLE CODE | 600 SUBCARRIER PHASE OF CELL-SPECIFIC SCRAMBLE CODE | 300 SUBCARRIER PHASE OF CELL-SPECIFIC SCRAMBLE CODE | 144 SUBCARRIER PHASE OF CELL-SPECIFIC SCRAMBLE CODE | 72 SUBCARRIER PHASE OF CELL-SPECIFIC SCRAMBLE CODE |
|---|---|---|---|---|---|---|---|
| 0 | 0 | 1 | 0 ~ 199 | 50 ~ 149 | 75 ~ 124 | 88 ~ 111 | 94 ~ 105 |
| | | 2 | 200 ~ 399 | 250 ~ 349 | 275 ~ 324 | 288 ~ 311 | 294 ~ 305 |
| | 1 | 1 | 400 ~ 599 | 450 ~ 549 | 475 ~ 524 | 488 ~ 511 | 494 ~ 505 |
| | | 2 | 600 ~ 799 | 650 ~ 749 | 675 ~ 724 | 688 ~ 711 | 694 ~ 705 |
| 1 | 2 | 1 | 800 ~ 999 | 850 ~ 949 | 875 ~ 924 | 888 ~ 911 | 894 ~ 905 |
| | | 2 | 1000 ~ 1199 | 1050 ~ 1149 | 1075 ~ 1124 | 1088 ~ 1111 | 1094 ~ 1105 |
| | 3 | 1 | 1200 ~ 1399 | 1250 ~ 1349 | 1275 ~ 1324 | 1288 ~ 1311 | 1294 ~ 1305 |
| | | 2 | 1400 ~ 1599 | 1450 ~ 1549 | 1475 ~ 1524 | 1488 ~ 1511 | 1494 ~ 1505 |
| 2 | 4 | 1 | 1600 ~ 1799 | 1650 ~ 1749 | 1675 ~ 1724 | 1688 ~ 1711 | 1694 ~ 1705 |
| | | 2 | 1800 ~ 1999 | 1850 ~ 1949 | 1875 ~ 1924 | 1888 ~ 1911 | 1894 ~ 1905 |
| | 5 | 1 | 2000 ~ 2199 | 2050 ~ 2149 | 2075 ~ 2124 | 2088 ~ 2111 | 2094 ~ 2105 |
| | | 2 | 2200 ~ 2399 | 2250 ~ 2349 | 2275 ~ 2324 | 2288 ~ 2311 | 2294 ~ 2305 |
| 3 | 6 | 1 | 2400 ~ 2599 | 2450 ~ 2549 | 2475 ~ 2524 | 2488 ~ 2511 | 2494 ~ 2505 |
| | | 2 | 2600 ~ 2799 | 2650 ~ 2749 | 2675 ~ 2724 | 2688 ~ 2711 | 2694 ~ 2705 |
| | 7 | 1 | 2800 ~ 2999 | 2850 ~ 2949 | 2875 ~ 2924 | 2888 ~ 2911 | 2894 ~ 2905 |
| | | 2 | 3000 ~ 3199 | 3050 ~ 3149 | 3075 ~ 3124 | 3088 ~ 3111 | 3094 ~ 3105 |
| 4 | 8 | 1 | 3200 ~ 3399 | 3250 ~ 3349 | 3275 ~ 3324 | 3288 ~ 3311 | 3294 ~ 3305 |
| | | 2 | 3400 ~ 3599 | 3450 ~ 3549 | 3475 ~ 3524 | 3488 ~ 3511 | 3494 ~ 3505 |
| | 9 | 1 | 3600 ~ 3799 | 3650 ~ 3749 | 3675 ~ 3724 | 3688 ~ 3711 | 3694 ~ 3705 |
| | | 2 | 3800 ~ 3999 | 3850 ~ 3949 | 3875 ~ 3924 | 3888 ~ 3911 | 3894 ~ 3905 |
| 5 | 10 | 1 | 4000 ~ 4199 | 4050 ~ 4149 | 4075 ~ 4124 | 4088 ~ 4111 | 4094 ~ 4105 |
| | | 2 | 4200 ~ 4399 | 4250 ~ 4349 | 4275 ~ 4324 | 4288 ~ 4311 | 4294 ~ 4305 |
| | 11 | 1 | 4400 ~ 4599 | 4450 ~ 4549 | 4475 ~ 4524 | 4488 ~ 4511 | 4494 ~ 4505 |
| | | 2 | 4600 ~ 4799 | 4650 ~ 4749 | 4675 ~ 4724 | 4688 ~ 4711 | 4694 ~ 4705 |
| 6 | 12 | 1 | 4800 ~ 4999 | 4850 ~ 4949 | 4875 ~ 4924 | 4888 ~ 4911 | 4894 ~ 4905 |
| | | 2 | 5000 ~ 5199 | 5050 ~ 5149 | 5075 ~ 5124 | 5088 ~ 5111 | 5094 ~ 5105 |
| | 13 | 1 | 5200 ~ 5399 | 5250 ~ 5349 | 5275 ~ 5324 | 5288 ~ 5311 | 5294 ~ 5305 |
| | | 2 | 5400 ~ 5599 | 5450 ~ 5549 | 5475 ~ 5524 | 5488 ~ 5511 | 5494 ~ 5505 |
| 7 | 14 | 1 | 5600 ~ 5799 | 5650 ~ 5749 | 5675 ~ 5724 | 5688 ~ 5711 | 5694 ~ 5705 |
| | | 2 | 5800 ~ 5999 | 5850 ~ 5949 | 5875 ~ 5924 | 5888 ~ 5911 | 5894 ~ 5905 |
| | 15 | 1 | 6000 ~ 6199 | 6050 ~ 6149 | 6075 ~ 6124 | 6088 ~ 6111 | 6094 ~ 6105 |
| | | 2 | 6200 ~ 6399 | 6250 ~ 6349 | 6275 ~ 6324 | 6288 ~ 6311 | 6294 ~ 6305 |
| 8 | 16 | 1 | 6400 ~ 6599 | 6450 ~ 6549 | 6475 ~ 6524 | 6488 ~ 6511 | 6494 ~ 6505 |
| | | 2 | 6600 ~ 6799 | 6650 ~ 6749 | 6675 ~ 6724 | 6688 ~ 6711 | 6694 ~ 6705 |
| | 17 | 1 | 6800 ~ 6999 | 6850 ~ 6949 | 6875 ~ 6924 | 6888 ~ 6911 | 6894 ~ 6905 |
| | | 2 | 7000 ~ 7199 | 7050 ~ 7149 | 7075 ~ 7124 | 7088 ~ 7111 | 7094 ~ 7105 |
| 9 | 18 | 1 | 7200 ~ 7399 | 7250 ~ 7349 | 7275 ~ 7324 | 7288 ~ 7311 | 7294 ~ 7305 |
| | | 2 | 7400 ~ 7599 | 7450 ~ 7549 | 7475 ~ 7524 | 7488 ~ 7511 | 7494 ~ 7505 |
| | 19 | 1 | 7600 ~ 7799 | 7650 ~ 7749 | 7675 ~ 7724 | 7688 ~ 7711 | 7694 ~ 7705 |
| | | 2 | 7800 ~ 7999 | 7850 ~ 7949 | 7875 ~ 7924 | 7888 ~ 7911 | 7894 ~ 7905 |

FIG. 10

PILOT SIGNAL TRANSMITTING METHOD, BASE STATION, MOBILE STATION AND CELLULAR SYSTEM TO WHICH THE METHOD IS APPLIED

CROSS-REFERENCE TO RELATED APPLICATIONS

This application is a continuation of U.S. application Ser. No. 12/560,540, filed on Sep. 16, 2009, now pending, which is a continuation of international application PCT/JP2007/000298, which was filed on Mar. 26, 2007, the contents of each are herein wholly incorporated by reference.

TECHNICAL FIELD

The present invention relates to a pilot signal transmitting method, and a base station, mobile station and cellular system to which this method is applied.

BACKGROUND

In a cellular system, a mobile station normally performs a cell search processing to seek a cell which connects a radio link.

The cell search is executed using a synchronization channel (SCH) included in a radio frame in a downstream link. In addition to the synchronization channel, a cell-specific pilot channel and a broadcast channel (BCH) may also be used (Non-patent Document 1: 3GPP TR 25. 814 V7.0.0). An example of the cell search will be described with reference to the drawings.

Figure 1:
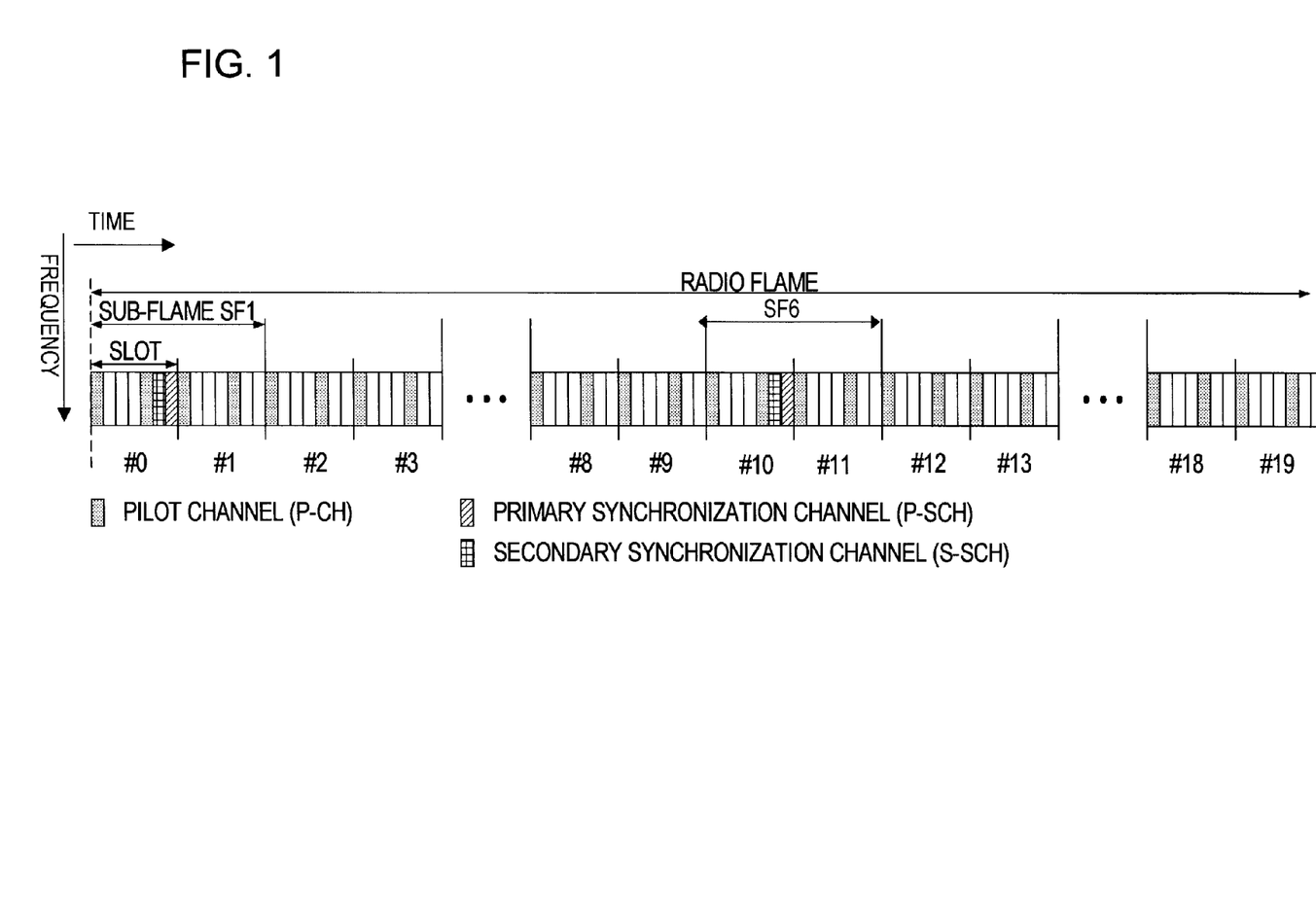
FIG. 1 is an example of a configuration of a radio frame transmitted from a base station transmission apparatus.

FIG. 1 indicates an example of a configuration of a radio frame transmitted from a base station transmission apparatus.

As FIG. 1 indicates, the radio frame is constructed by various channels multiplexed in a two-dimensional direction of time and frequency. In the example in FIG. 1, the radio frame has 10 sub-frames, SF1 to SF10, in the time direction, and each sub-frame SF consists of two slots: the first half slot and the latter half slot.

In each slot, a resource uniquely determined by a symbol position (time) and a sub-carrier position (frequency) is called a "resource element".

The various channels multiplexed in a slot includes a primary synchronization channel (P-SCH), a secondary synchronization channel (S-SCH) and a pilot signal channel (P-CH).

The primary synchronization channel (P-SCH) has a common pattern for all the cells, and is time-multiplexed in the end symbols of the first half slot #0 of the first sub-frame SF1 and of the first half slot #10 of the sixth sub-frame SF6 respectively.

The secondary synchronization channel (S-SCH) has a pattern, which is specific to a cell ID group, and which is a group of cell IDs assigned to each cell in advance. The secondary synchronization channel (S-SCH) is time-multiplexed in the second symbol from the respective ends of the first half slot #0 of the first sub-frame SF1 and of the first half slot #10 of the sixth sub-frame SF6.

The pilot signal channel (P-CH) also has a cell-specific scramble code which is information specific to a cell, and is time-multiplexed in the first symbol and the fifth symbol of each slot (#0, #1, #2, ... ).

The cell ID assigned to each cell and the cell-specific scramble code correspond one-to-one, so the mobile station can determine a cell ID of a cell in which the mobile station is located by specifying the cell-specific scramble code.

For the cell-specific scramble code, a method of using a sequence of a base station-specific pseudo-random number sequence multiplied by a phase rotation sequence, which is orthogonal between sectors within a same base station, or a method of using a generalized chirp like sequence for the pseudo-random number sequence, for example, may be used.

Figure 2:
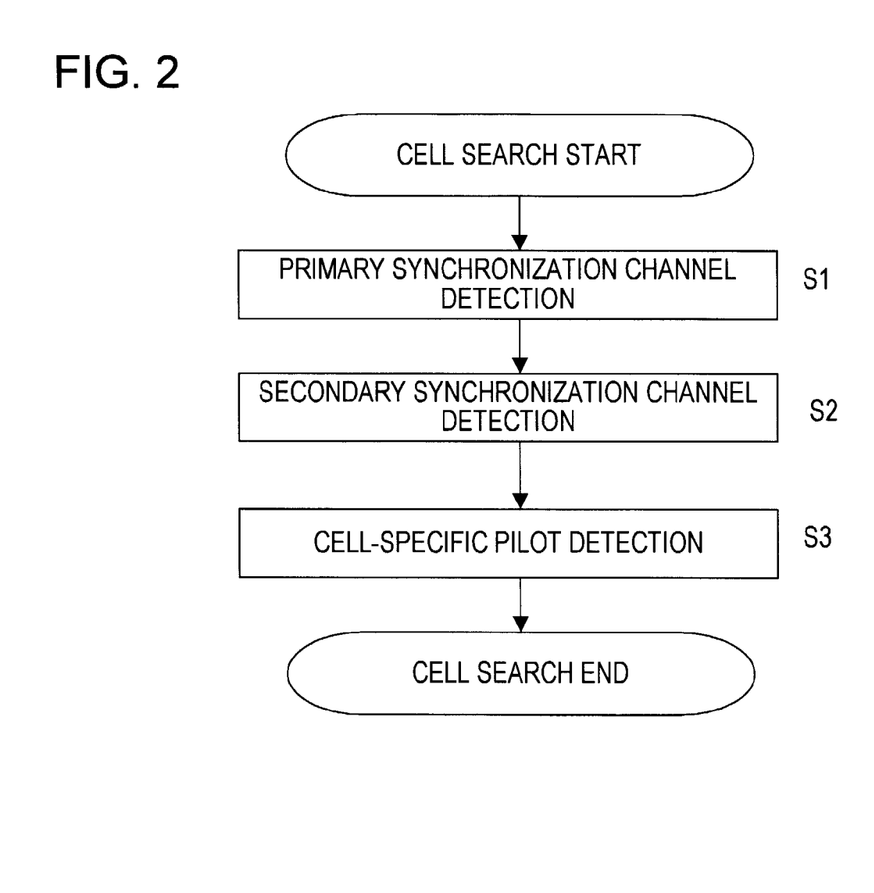
FIG. 2 illustrates a cell search processing procedure in a mobile station.

FIG. 2 illustrates a cell search processing procedure performed in a mobile station. When the radio format depicted in FIG. 1 is received from a base station, the mobile station detects the correlation with a replica of a time signal of the primary synchronization channel (P-SCH), which is a known pattern, as a processing in the first step, and decides a timing indicating the maximum correlation value, for example, as the sub-frame timing (step S1).

As the second step, fast Fourier transform (FFT) processing is performed at the timing detected in the first step, so that the received radio format is transformed into a frequency domain signal, and the secondary synchronization channel (S-SCH) is extracted from the frequency domain signal. Then correlation of the extracted secondary synchronization channel (S-SCH) and each candidate secondary synchronization channel sequence replica is determined, and a candidate secondary synchronization channel sequence having a maximum correlation value, for example, is decided as a detected secondary synchronization channel sequence. A cell ID group is determined by the detected secondary synchronization channel (step S2).

As the third step, fast Fourier transform (FFT) processing is performed at the timing detected in the first step so that the signal is transformed into a frequency domain signal, and the pilot signal channel (P-CH) is extracted from the transferred frequency domain. Then the extracted pilot signal channel (P-CH) is correlated with a scramble code replica corresponding to each candidate cell ID included in the cell ID group detected in the second step, and a cell ID corresponding to a candidate scramble code indicating a maximum correlation value, for example, is decided as a detected cell ID (step S3). By this, a cell in which the mobile station is located may be specified.

In the case of 3GPP (Third Generation Partnership Project), specifications of the multimedia broadcast/multicast service (MBMS) are under consideration, aiming at standardizing the next generation portable telephone communication.

For example, MBMS data is time-multiplexed with the unicast data in sub-frame units. The Non-patent Document 1 describes a method for improving the reception quality by using a guard interval, which is longer than the guard interval used for unicast data, transmitting a same data from a plurality of cells at a same timing using a same frequency, and combining received signals at a mobile station side.

This is called a "single frequency network". In this case, a same cell-common pilot signal among cells is transmitted for demodulating the same MBMS data transmitted from a plurality of cells.

The Non-patent Document 2 describes that the control signal for a unicast is multiplexed with a sub-frame allocated to MBMS data (hereafter called MBMS sub-frame), and a cell-specific pilot signal having a different pattern in each cell for unicast is multiplexed with the MBMS sub-frame for demodulating the control signal for unicast and measuring CQI.

A configuration of a pilot signal of an MBMS sub-frame is also described in Non-patent Document 3. According to this configuration, a cell-specific pilot signal for unicast is multiplexed only with a first symbol of an MBMS sub-frame.

In the case of time-multiplexing an MBMS sub-frame, as mentioned above, sub-frames having different guard interval lengths are time-multiplexed. In an initial cell search which is executed when power of the mobile station is turned ON, a problem occurs in the above mentioned third step of a cell search, since information on the guard interval length of the receive sub-frame is not available.

This problem is described in detail in Non-patent Document 4. One means for solving this problem is to improve a method for attaching a guard interval of MBMS sub-frames, as described in the Non-patent Document 4. Another method is using, as indicated in non-patent Document 5, only pilot signals in a sub-frame in which a synchronization channel has been multiplexed in the initial cell search.

Non-patent Document 1: 3GPP TR 25. 814 V 7.0.0
Non-patent Document 2: 3GPP TSG-RAN WG1, R1-060372, "Multiplexing of Unicast Pilot and Control Channels in E-MBMS for E-UTRA Downlink", Texas Instruments
Non-patent Document 3: 3GPP TSG-RAN WG1, R1-070383, "Reference Signals for Mixed Carrier MBMS", Nokia
Non-patent Document 4: 3GPP TSG-RAN WG1, R1-060563, "Channel Design and Long CP Sub-frame Structure for Initial Cell Search", Fujitsu
Non-patent Document 5: 3GPP TSG RAN WG1, R1-063304, "Three-step Cell Search Method for E-UTRA", NTT DoCoMo, Institute for Infocomm Research, Mitsubishi Electric, Panasonic, Toshiba Corporation.

If MBMS sub-frames are multiplexed in a radio frame, a number of resource elements of cell-specific pilot signals in one radio frame decreases, compared with a case of assigning only unicast sub-frames to the radio frame (this relationship may be reversed in some cases).

The number of resource elements of cell-specific pilot signals in one radio frame also depends on the number of MBMS sub-frames that are multiplexed. For example, if a cycle of scramble codes of cell-specific pilot signals is one radio frame, then the phase of the scramble code at each transmission timing of the cell-specific pilot signal changes by multiplexing the MBMS sub-frames.

Figure 3:
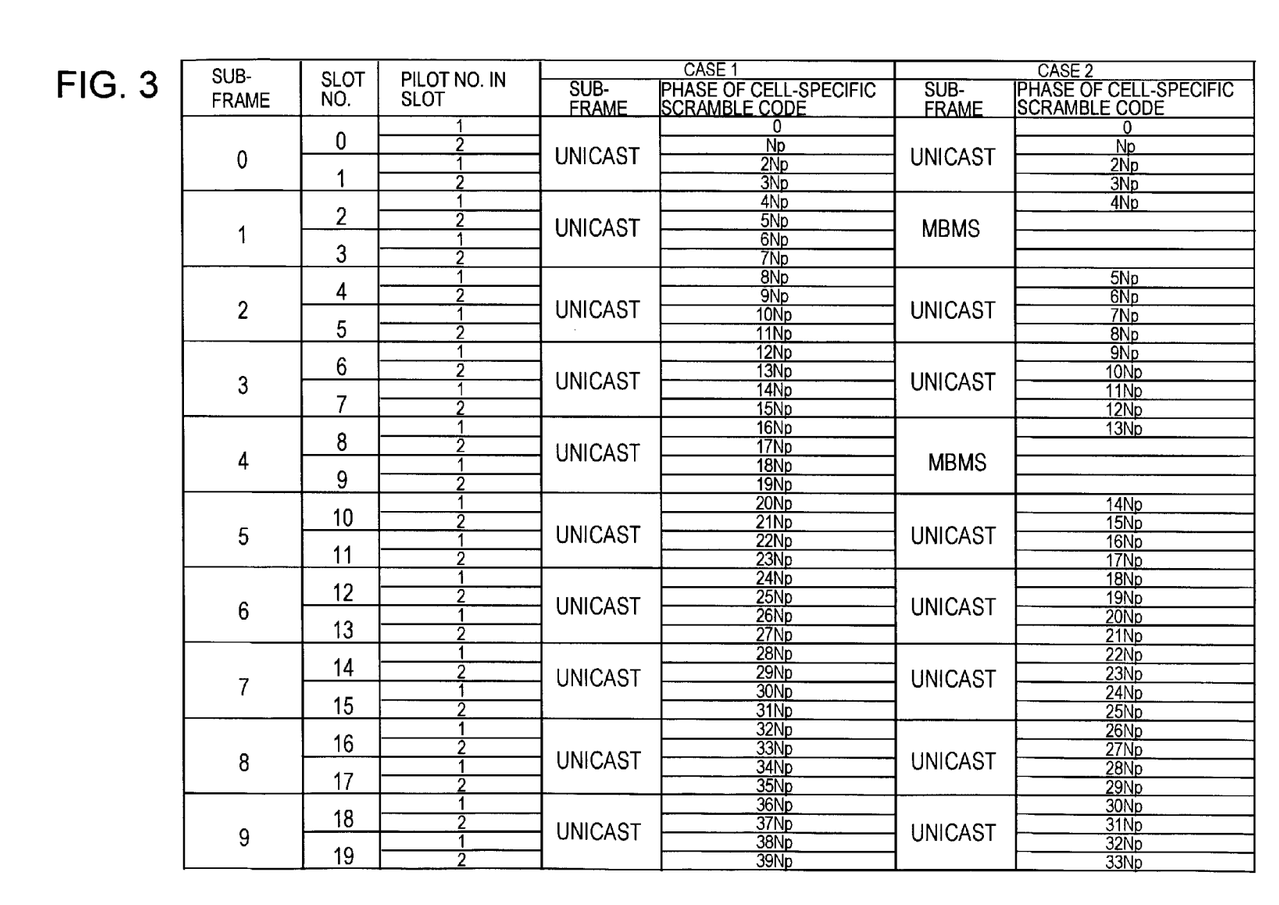
FIG. 3 illustrates a case of allocating all the sub-frames of a radio frame to unicast and a case of allocating the sub-frames to MBMS as examples.

FIG. 3 illustrates a case of allocating all the sub-frames of a radio frame to unicast (case 1), and a case of allocating the sub-frames #1 and #4 to MBMS (case 2) as examples.

In FIG. 3, the column "phase of cell-specific scramble code" is based on the assumption that the cell-specific scramble code is a cell-specific pilot signal, and resource elements allocated to the cell-specific pilot signal are listed from one at the lower frequency side, and are indicated by a phase of the cell-specific scramble code allocated to the resource element at the lowest frequency side at each transmission timing of the cell-specific pilot signal.

Np denotes a number of resource elements allocated to the cell-specific pilot signal in each symbol of the cell-specific pilot signal.

In case 1, where all the sub-frames are allocated to unicast, the phase shift of the cell-specific scramble code does not occur.

In case 2, on the other hand, the sub-frames #1 and #4 are allocated to MBMS, so a phase shift of the cell-specific scramble code occurs.

As the Non-patent Document 5 indicates, when correlation is determined using the cell-specific pilot signals in the sub-frames #0 and #5 in which the synchronization channel is multiplexed, if the phase shift of cell-specific scramble codes has occurred, it is inevitable to perform blind detection since the phases of cell-specific pilot signals in sub-frame #5 are unknown, therefore the processing volume increases and detection probability deteriorates.

DISCLOSURE OF THE INVENTION

With the foregoing in view, it is an object of the present invention to simplify correlation detection in a mobile station. It is another object of the present invention to control the change amount of a transmission start phase of a pilot signal to a predetermined value among (sub) frames.

It is still another object to provide a pilot signal transmitting method to perform correlation processing when unicast data and MBMS sub-frames are multiplexed in radio frames, causing no phase shift of cell-specific scramble codes at each timing of a cell-specific pilot signal symbol, and therefore to implement appropriate cell search processing without increasing in scale or complicating the configuration of the mobile station, along with a base station, a mobile station and a cellular station to which this method is applied.

In order to attain the above objects, this invention is characterized in that a transmitting method used in a mobile communication system a base station are used. In other words, in the present invention, a cell-specific pilot signal transmitting method used in a mobile communication system, which has a base station and a mobile station that performs radio communication with the base station in a cell of a radio communication area formed by the base station, and which mixes and transmits unicast data and broadcast/multicast data as downstream data from the base station to the mobile station, wherein a difference between a start phase of a cell-specific pilot signal transmitted in a sub-frame in which the base station has transmitted the unicast data and a start phase of a cell-specific pilot signal transmitted in a next sub-frame is equal to a difference between a start phase of a cell-specific pilot signal transmitted in a sub-frame in which the base station transmitted the broadcast/multicast data and a start phase of a cell-specific pilot signal transmitted in a next sub-frame.

Further, a base station according to the present invention that forms a radio communication area for communicating with a mobile station in a mobile communication system that mixes and transmits unicast data and broadcast/multicast data, includes a phase control unit which controls to equalize a difference between a start phase of a cell-specific pilot signal transmitted in a sub-frame in which the base station has transmitted said unicast data and a start phase of a cell-specific pilot signal to be transmitted in a next sub-frame and a difference between a start phase of a cell-specific pilot signal transmitted in a sub-frame in which the base station has transmitted the broadcast/multicast data and a start phase of a cell-specific pilot signal to be transmitted in the next sub-frame.

According to the present invention having the above characteristics, in a system which mixes and transmits unicast data and MBMS data as downstream data, correlation processing is performed at each timing of a cell-specific pilot signal symbol causing no phase shift of cell-specific scramble codes, even if a number of resource elements allocated to a cell-specific pilot signal in a radio frame changes depending on a number of MBMS sub-frames which are allocated to the radio frame.

Therefore appropriate cell search processing is implemented without increasing in scale or complicating the configuration of the mobile station, and the mobile station can be simplified and characteristics thereof during cell search processing can be improved, therefore the present invention will be extremely useful in the mobile communication field.

BRIEF DESCRIPTION OF DRAWINGS

FIG. 9 illustrates the phases of cell-specific pilot signals in each frequency band according to the second embodiment;

DESCRIPTION OF EMBODIMENTS

Embodiments of the present invention will now be described with reference to the drawings.

[First Embodiment]

Figure 4:
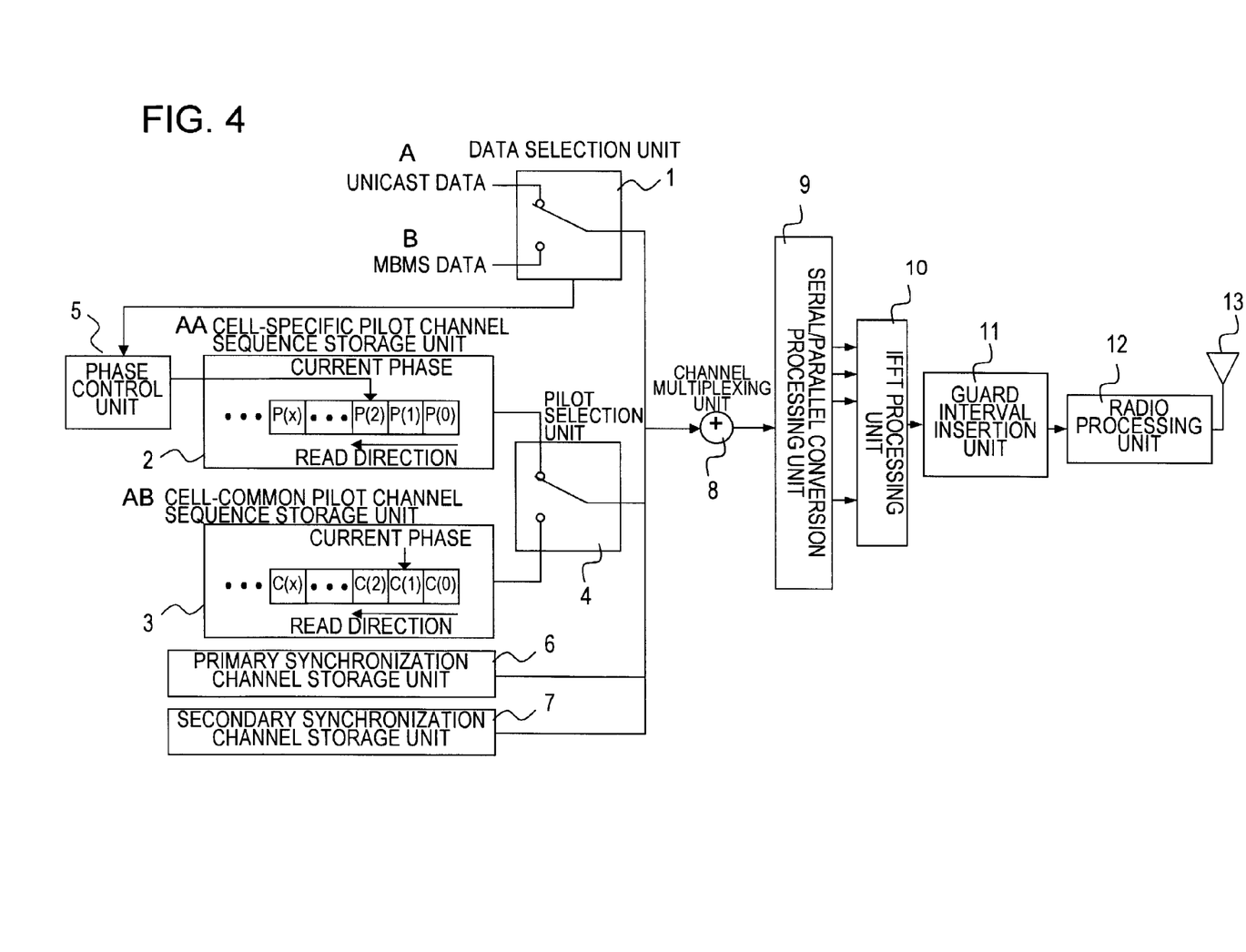
FIG. 4 is a block diagram depicting a configuration of the key portions of a base station transmission apparatus according to the present invention.

FIG. 4 is a block diagram depicting a configuration of the key portions of a base station transmission apparatus according to the present invention.

The base station transmission apparatus illustrated in FIG. 4 includes a data selection unit 1, a cell-specific pilot signal channel sequence storage unit 2, a cell common pilot signal sequence storage unit 3, a pilot signal selection unit 4, phase control unit 5, a primary synchronization channel storage unit 6, a secondary synchronization channel storage unit 7, a channel multiplexing unit 8, a serial/parallel conversion processing unit 9, a IFFT processing unit 10, a guard interval (GI) insertion unit 11, a radio processing unit 12, and a transmission antenna 13.

The data selection unit 1 selects unicast data A or MBMS data B according to scheduling, and sends one sub-frame of data to the channel multiplexing unit 8. If MBMS data B is selected by the data selection unit 1, an instruction of phase control is output to the phase control unit 5.

The pilot signal selection unit 4 changes a selection method for selecting a cell-specific pilot signal channel sequence AA or cell-common pilot signal channel sequence AB according to the type of transmission data of the sub-frame, and reads pilot signals from a corresponding storage unit 2 or 3. If the data type is MBMS, the pilot signal selection unit 4 reads one MBMS sub-frame of cell-specific pilot signals $N_{s\_m}$ and one MBMS sub-frame of cell-common pilot signals $N_{common}$ from the cell-specific pilot signal channel sequence storage unit 2 and cell-common pilot signal channel sequence storage channel sequence storage unit 3 respectively. If the data type is unicast data, one unicast sub-frame of cell-specific pilot signals $N_{s\_m}$, are read.

In this case, current phases of the cell-specific pilot signal channel sequence storage unit 2 and cell-common pilot signal channel sequence storage unit 3 are advanced by the amount of the phase which was read.

If the phase control is instructed, the phase control unit 5 advances the current phase of the cell-specific pilot signal channel sequence storage unit 2 by the amount of (phase amount corresponding to $N_{s\_u}$)−(phase amount corresponding to $N_{s\_m}$).

In other words, phase control is performed so that the difference between the start phase of a cell-specific pilot signal transmitted in a sub-frame in which the base station transmitted the unicast data and the start phase of the cell-specific pilot signal transmitted in the next sub-frame is equal to the difference between the start phase of a cell-specific pilot signal transmitted in a sub-frame in which the base station transmitted the broadcast/multicast data and the start phase of a cell-specific pilot signal transmitted in the next sub-frame.

In other words, in a pilot signal (e.g. cell-specific pilot signal) transmitting method in a mobile communication system that has a base station and a mobile station which performs radio communication with the base station in a cell of a radio communication area formed by the base station, in the case when the difference between the transmission start phase of the pilot signal to be transmitted and a transmission end phase is different between a first unit transmission period (e.g. sub-frame in which the base station transmits unicast data) and a second unit transmission period (e.g. sub-frame in which the base station transmits MBMS data), the base station controls the difference between the transmission start phase of the pilot signal in the first unit transmission period and the transmission start phase of the pilot signal in the second unit transmission period to be a predetermined difference which is greater than the difference between the transmission start phase and the transmission end phase (in the above example, phase is advances by (phase amount corresponding to $N_{s\_u}$)−(phase amount corresponding to $N_{s\_m}$)).

The channel multiplexing unit 8 multiplexes each channel signal (modulation data) of various channels (e.g. data channel, pilot signal channel, synchronization channel) to be transmitted to the mobile station UE (User Equipment), and the serial/parallel conversion processing unit 9 (may be abbreviated to S/P conversion unit herein below) performs serial/parallel conversion for the signal multiplexed by the channel multiplexing unit 8 (Nc number of modulation data) and positions each converted data in each sub-carrier (mapping).

Figure 5:
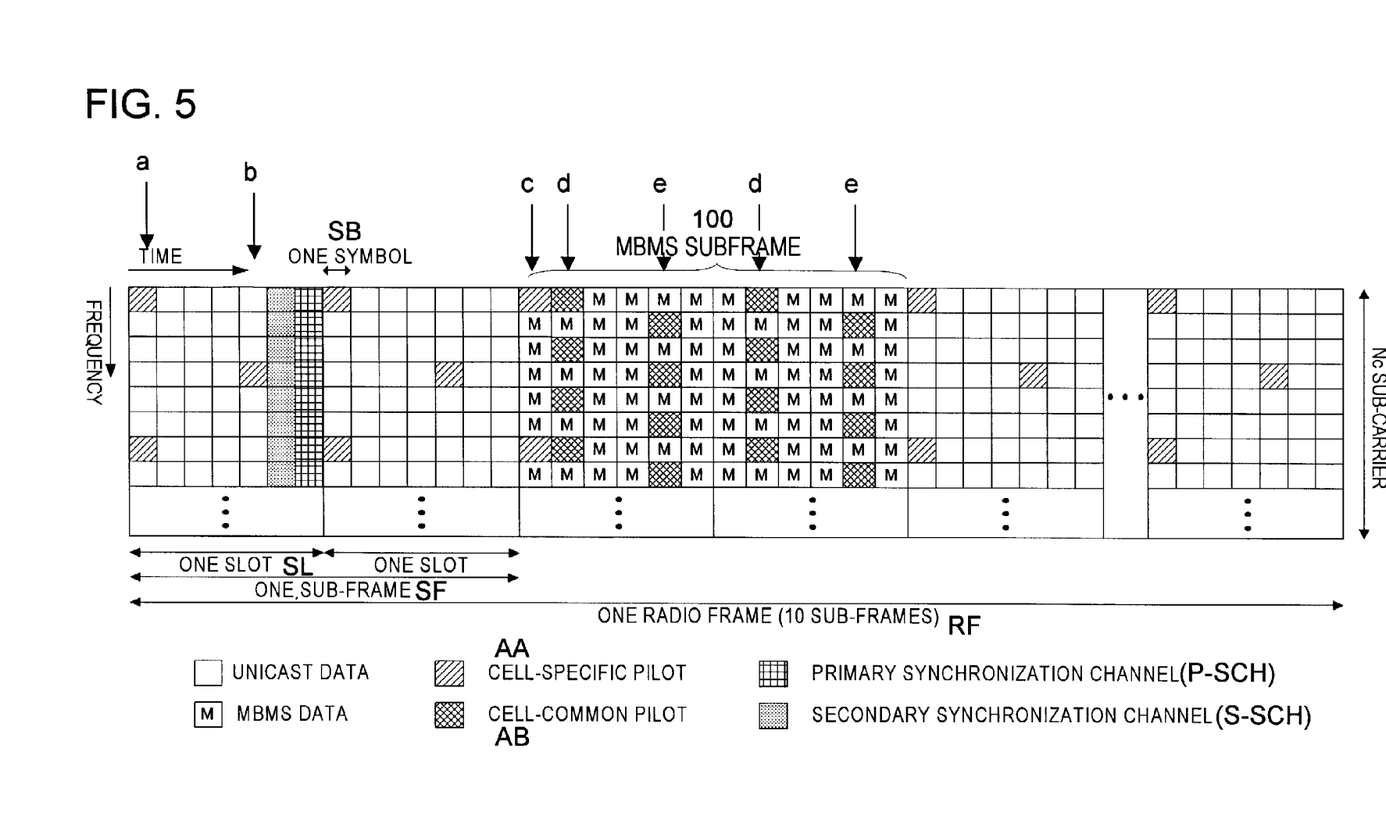
FIG. 5 is an example of a configuration of a radio frame, including an MBMS sub-frame, depicted by a two-dimensional diagram of time and frequency.

FIG. 5 illustrates an example of a configuration of a radio frame, including an MBMS sub-frame, depicted by a two-dimensional diagram of time and frequency. In this example, one radio frame (RF) consists of 10 sub-frames (SF), and one sub-frame consists of two slots (SL).

One slot includes seven symbols (SB) in the case of a unicast sub-frame, and includes six symbols in the case of an MBMS sub-frame 100 since the guard interval is long.

A cell-specific pilot signal AA is multiplexed in the first symbol a and the fifth symbol b of each slot of a unicast sub-frame at a six sub-carrier interval. The position of the fifth symbol b in the frequency direction is shifted by three sub-carriers from the position of the first symbol a in the frequency direction.

In the case of the MBMS sub-frame 100, on the other hand, a cell-specific pilot signal AA is multiplexed only in a first symbol c in the first half slot at a six sub-carrier interval.

A cell-common pilot signal AB is positioned in the second symbol d and the fifth symbol e of each slot of the MBMS sub-frame 100 at a two sub-carrier interval. The position of the fifth symbol in the frequency direction is shifted by one sub-carrier from the position of the second symbol in the frequency direction.

Figure 6:
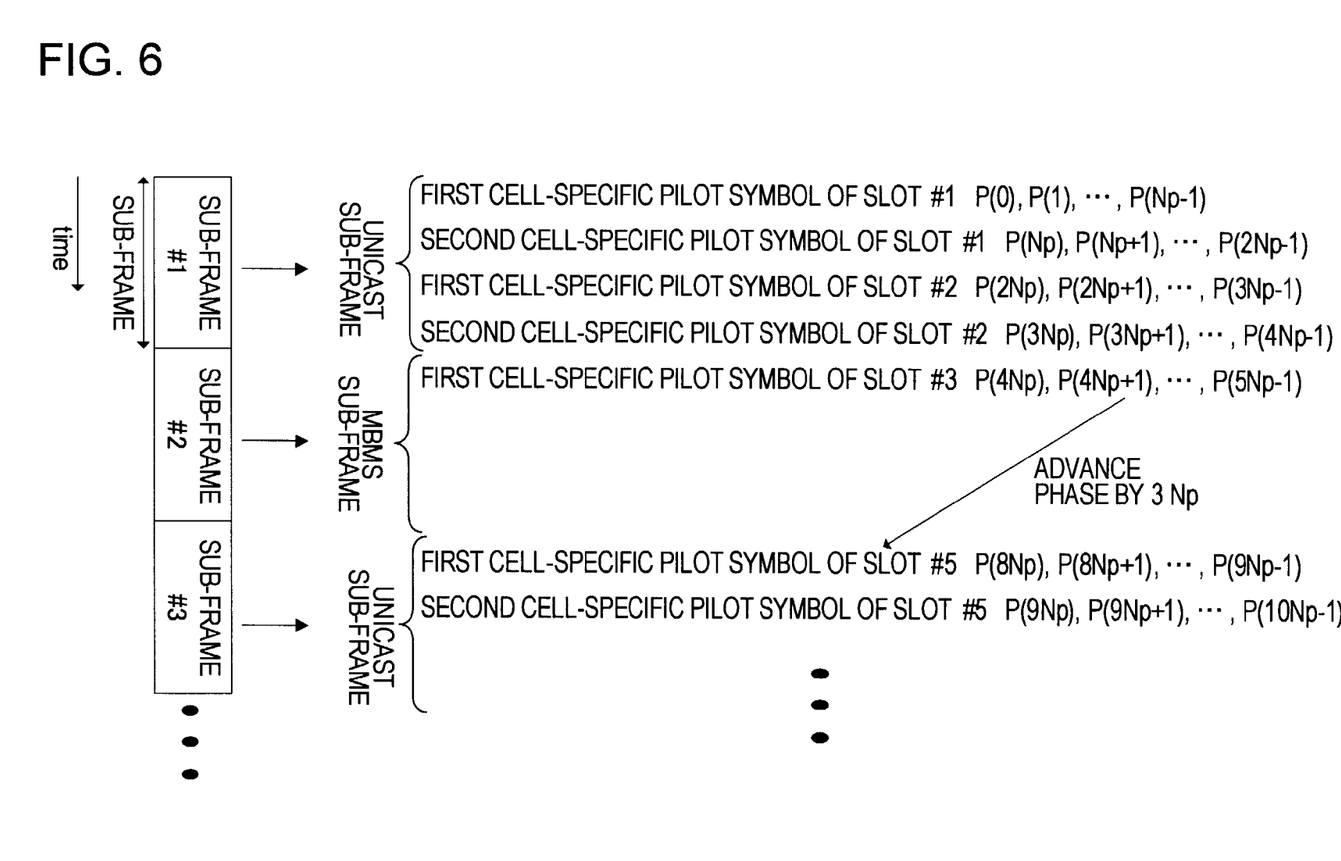
FIG. 6 is an example where the phase control unit controls phase of cell-specific scramble code as the same in cell specific pilot signal symbols.

A cell-specific scramble code to be transmitted as a cell-specific pilot signal channel AA, however, is controlled by the phase control unit 5 so that the start phase difference of a cell-specific pilot signal between each sub-frame becomes a predetermined amount. FIG. 6 illustrates an example.

In FIG. 6, the first sub-frame SF (#1) and the third sub-frame (#3) of the radio frame are allocated to unicast, and the second sub-frame (#2) is allocated to MBMS (hereafter the Xth sub-frame is denoted as sub-frame (#X)).

Np is a number of resource elements allocated to a cell-specific pilot signal channel in each cell-specific pilot signal symbol. In the example in FIG. 6, a number of cell-specific pilot signal symbols of one unicast sub-frame is 4, so $N_{s\_u}=4$ Np, and a number of cell-specific pilot signal symbols of one MBMS sub-frame is 1, so $N_{s\_u}=Np$.

Cell-specific scramble codes are positioned, from the low frequency side, to the resource elements allocated to the cell-specific pilot signal of the cell-specific pilot signal symbol which is transmitted first in the radio frame.

In the sub-frame (#2) allocated to MBMS, a cell-specific pilot signal is multiplexed only in the first symbol of the first half slot. Therefore phase of a cell-specific scramble code, which is allocated to the lowest frequency side of the next cell-specific pilot signal, is advanced by 3 Np by the phase control unit 5, and becomes P (8 NP).

Hereafter, each time an MBMS sub-frame is multiplexed, the phase of the cell-specific scramble code is advanced in the same manner. Because of this, the phase of the first cell-specific pilot signal symbol of each sub-frame is determined whether or not an MBMS sub-frame is present in the radio frame.

Referring back to FIG. 4, the IFFT processing unit 10 IFFT-processes the modulated data positioned in each sub-carrier, in Nc units, which corresponds to the number of sub-carriers, and converts it into time domain signals.

The guard interval insertion unit 11 inserts a guard interval in the time domain signals.

The radio processing unit 12 performs a required radio processing, such as frequency-converting the signals after the guard interval is inserted into predetermined radio signals (up-convert), and transmits the radio signals to a propagation path via the transmission antenna 13.

Now the configuration and operation of a mobile station corresponding to the above mentioned base station will be described.

Figure 7:
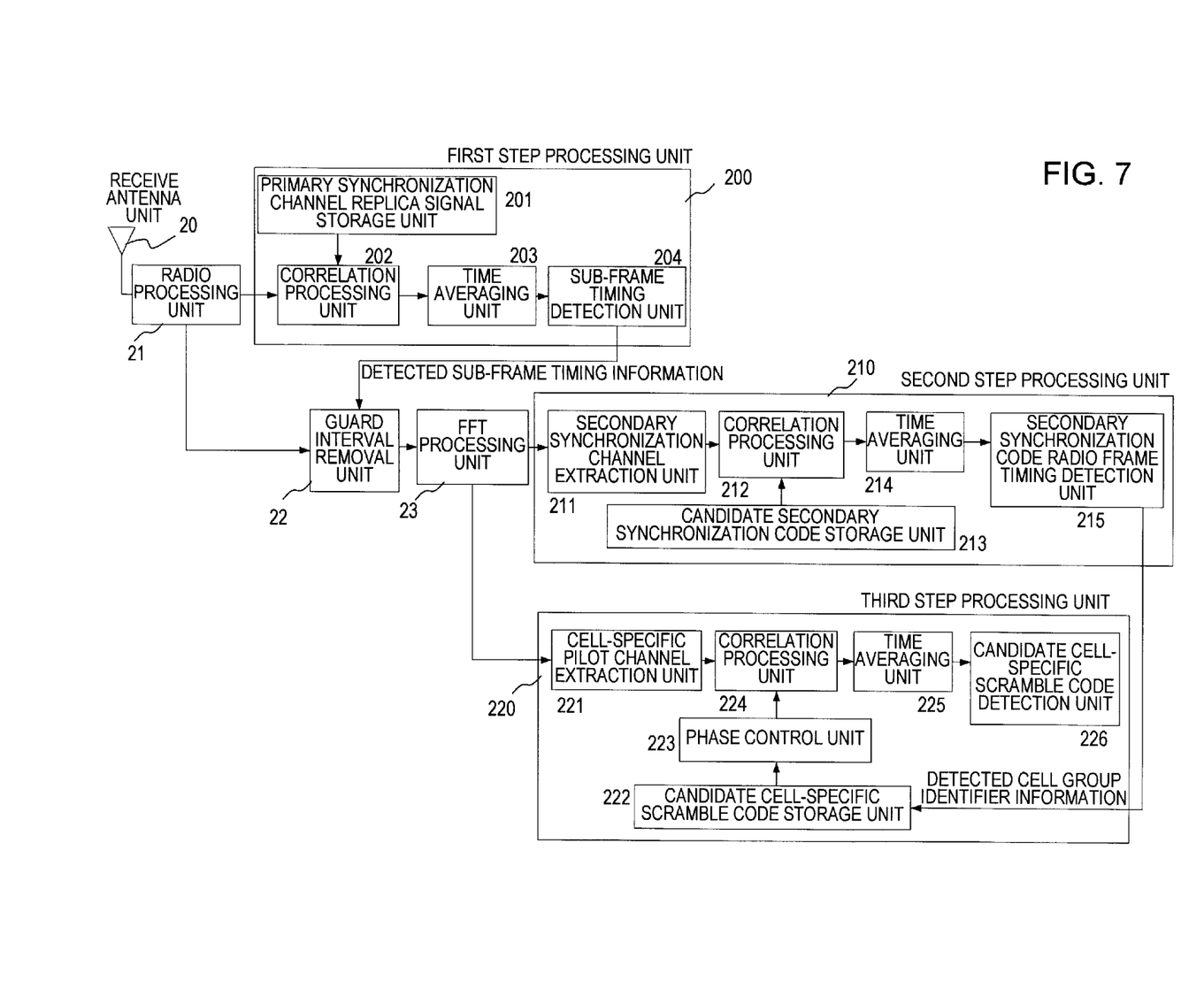
FIG. 7 is a block diagram depicting a configuration of the key portions of a mobile station in an OFDM communication system.

FIG. 7 is a block diagram depicting a configuration of the key portions of a mobile station in an OFDM communication system. The mobile station illustrated in FIG. 7 comprises, for example, a receive antenna unit 20, a radio processing unit 21, a first step processing unit 200, a second step processing unit 210, a third step processing unit 220, a guard interval removal unit 22 and an FFT processing unit 23.

The first step processing unit 200 has a first synchronization channel replica signal storage unit 201, a correlation processing unit 202, a time averaging unit 203 and a sub-frame timing detection unit 204. The second step processing unit 210 has a secondary synchronization channel extraction unit 211, a correlation processing unit 212, a candidate secondary synchronization code storage unit 213, a time averaging unit 214, and a secondary synchronization code radio frame timing detection unit 215. The third step processing unit 230 has a cell-specific pilot signal channel extraction unit 231, a candidate cell-specific scramble code storage unit 232, a phase control unit 233, a correlation processing unit 234, a time averaging unit 235 and a cell-specific scramble code detection unit 236.

Now the receive processing of the mobile station having this configuration will be described.

The receive antenna unit 20 receives a radio signal from the above mentioned base station BS, and the radio processing unit 21 performs the required radio receive processing, such as down convert processing, for the radio signals received by the receive antenna unit 20.

As a first step processing of cell search by the first step processing unit 200, a sub-frame timing is synchronously detected based on the correlation of the receive signal from the radio processing unit 21 and a replica signal of the primary synchronization channel (P-SCH), which is a known pattern (FIG. 2: step S1).

For this, in the first step processing unit 200, the primary synchronization channel replica signal storage unit 201 has stored replica signals of the primary synchronization channel in advance, and the correlation processing unit 202 determines correlation of the receive signal and the replica signal stored in the primary synchronization channel replica signal storage unit 201.

This correlation processing result by the correlation processing unit 202 is time-averaged by the time averaging unit 203, and is input to the sub-frame timing detection unit 204. The sub-frame timing detection unit 204 detects the sub-frame timing of the receive signal based on the correlation processing result by the correlation processing unit 202. For example, the timing at which the correlation is maximum can be detected as the sub-frame timing.

As the second step processing of cell search (FIG. 2: step S2), the second step processing unit 210 performs fast Fourier transform (FFT) processing based on the sub-frame timing detected in the first step processing unit 200, as mentioned above, extracts the secondary synchronization channel, and detects the secondary synchronization code and frame timing.

For this, the guard interval removal unit 22 removes the guard intervals inserted in the receive signals, which are radio-processed by the receive processing unit 21 based on the sub-frame timing detected by the sub-frame timing detection unit 204 of the first step processing unit 200.

The FFT processing unit 23 converts the receive signals in the time domain into signals in the frequency domain by performing FFT processing on valid signals after removing the guard intervals using a predetermined time block (at least the time of valid symbol length), that is, using an FFT window.

The secondary synchronization channel extraction unit 210 extracts resource elements in which the secondary synchronization channel is multiplexed, from the frequency domain signal after the above mentioned FFT processing by the FFT processing unit 23. On the other hand, candidate secondary synchronization codes to be used for the correlation processing in the correlation processing unit 212 are stored in the secondary synchronization code storage unit 213 in advance. The correlation processing unit 212 determines correlation of the secondary synchronization channel extracted by the secondary synchronization channel extraction unit 211 and the candidate secondary synchronization codes stored in the candidate secondary synchronization code storage unit 213.

The output of the correlation processing unit 212 is averaged by the time averaging unit 214, and the secondary synchronization code radio frame timing detection unit 215 detects a secondary synchronization code and a radio frame timing based on the correlation processing result in the correlation processing unit 212. For example, a candidate secondary synchronization code having the maximum correlation can be decided as the detected secondary synchronization code. By this, a cell group is determined.

The third step processing unit 220 performs cell-specific pilot signal detection processing (FIG. 2: step S3), and the receive signal after FFT processing is input to the cell-specific pilot signal channel extraction unit 221. The cell-specific pilot signal channel extraction unit 221 extracts a resource element in which a cell-specific pilot signal is multiplexed from the frequency domain signals after the FFT processing by the FFT processing unit 23.

The candidate cell-specific scramble code storage unit 223 has stored replicas of candidate cell-specific scramble codes used for the correlation processing by correlation processing unit 224.

The correlation processing unit 224 determines correlation of a cell-specific pilot signal extracted by the cell-specific pilot signal channel extraction unit 221 and a candidate cell-specific scramble code replica stored in the candidate cell-specific scramble code storage unit 222.

The output of the correlation processing unit 224 is time-averaged by the time averaging unit 225, and the cell-specific scramble code detection unit 226 detects a cell-specific scramble code based on the correlation processing result in the correlation processing unit 224. For example, a candidate cell-specific scramble code having the maximum correlation can be decided as the detected cell-specific scramble code. By this, a cell in which the mobile station is located is specified as a result of cell search.

[Second Embodiment]

The second embodiment is an example when the first embodiment is applied to a system which can transmit downstream signals using one of a plurality of frequency bands. The configuration of the base station and configuration of the mobile system are basically the same as the configurations illustrated in FIG. 4 and FIG. 7, which are described above.

Figure 8:
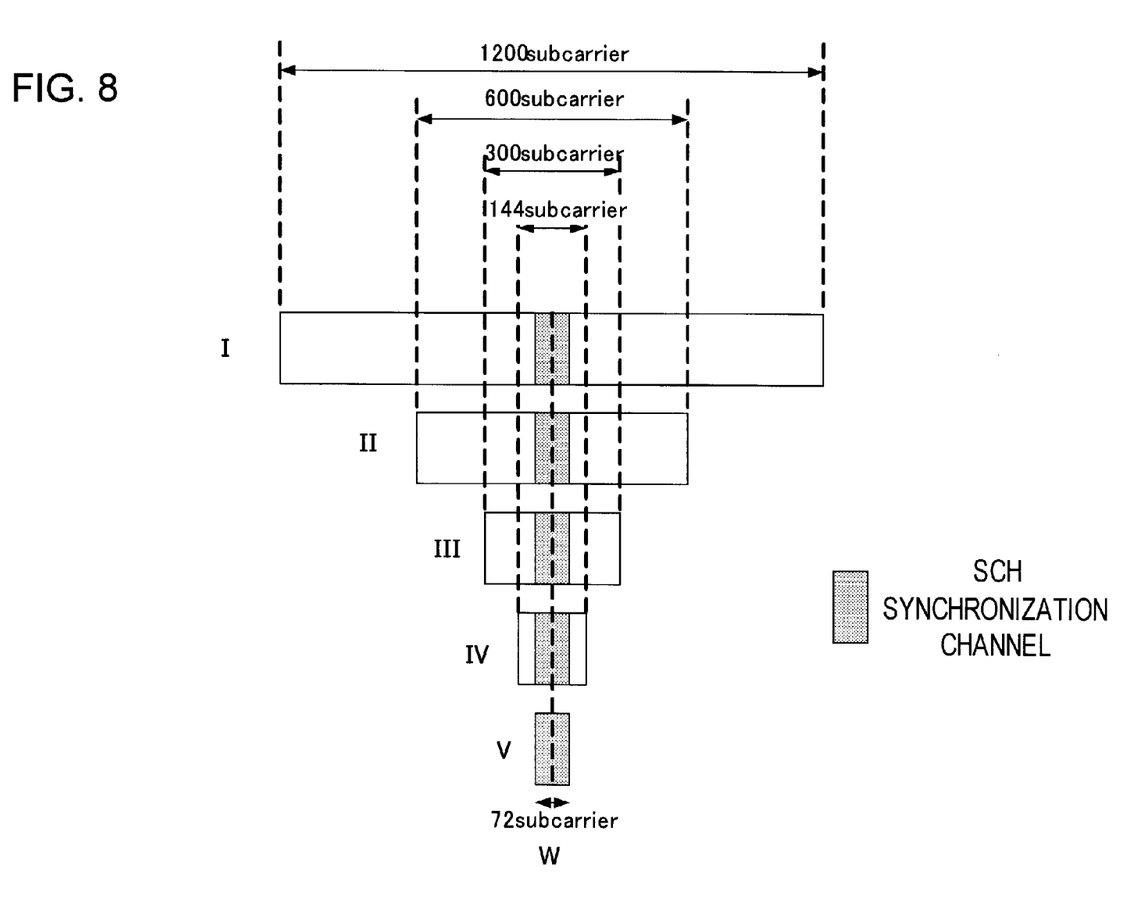
FIG. 8 is a diagram depicting the second embodiment.

FIG. 8 is a diagram depicting the second embodiment, and illustrates case I having 1200 sub-carriers, case II having 600 sub-carriers, case III having 300 sub-carriers, case IV having 144 sub-carriers, and case V having 72 sub-carriers, as the frequency bands.

A characteristic of the second embodiment is that a synchronization channel SCH is transmitted with a bandwidth W, which is equal to the minimum frequency band of 72 sub-carriers at the center, for all the cases of frequency bands I to V having a plurality of sub-carriers.

FIG. 9 illustrates the phases of cell-specific pilot signals in each frequency band according to the second embodiment. In the case of an MBMS sub-frame being multiplexed as well, the phase of the cell-specific pilot signal at each transmission timing is adjusted by the phase control unit 5 (see FIG. 4), as illustrated in FIG. 9.

Regardless which frequency band is used, the phase of the cell-specific pilot signal is always the same in band W of the center 72 sub-carriers.

In the initial cell search, a frequency band of the receive signals is unknown, therefore cell search is performed by receiving only signals having bandwidth W, which is equal to the minimum frequency band. In the radio processing unit 21, signals having a bandwidth which is equal to the minimum frequency band are received using an analog filter. This reception may be performed after the radio processing unit 21 using a digital filter. Or the reception may be performed both in and after the radio processing unit 21.

The first step S1 and second step S2 of the cell search described in the first embodiment are performed to detect a sub-frame timing, cell ID group and radio frame timing. As mentioned above, in the synchronization channel SCH the signals are transmitted, in any frequency band, at the center of the frequency band, having a bandwidth W, which is equal to the minimum frequency band, so even if the frequency band is unknown, the first step S1 and second step S2 of the cell search can be executed using the synchronization channel SCH.

Then the third step S3 of the cell search described in the first embodiment is performed, and cell-specific scramble codes are detected. In this case, the phase at each transmission timing of the cell-specific pilot signal does not depend on which frequency band is used, and does not depend on whether or not an MBMS sub-frame is multiplexed, so the mobile station can detect the cell-specific scramble codes without knowing which frequency band is used, and without causing a phase shift of a cell-specific pilot signal by multiplexing an MBMS sub-frame.

[Third Embodiment]

The third embodiment is also applied based on the first embodiment, and the base station transmission apparatus and mobile station have the same configuration as the configuration described in the first embodiment.

The third embodiment is a case when a cell-specific pilot signal in an MBMS sub-frame is transmitted only in a limited part of the bands.

This configuration is applied to a case when a unicast control signal is transmitted in an MBMS sub-frame only in a limited part of the bands.

Figure 10:
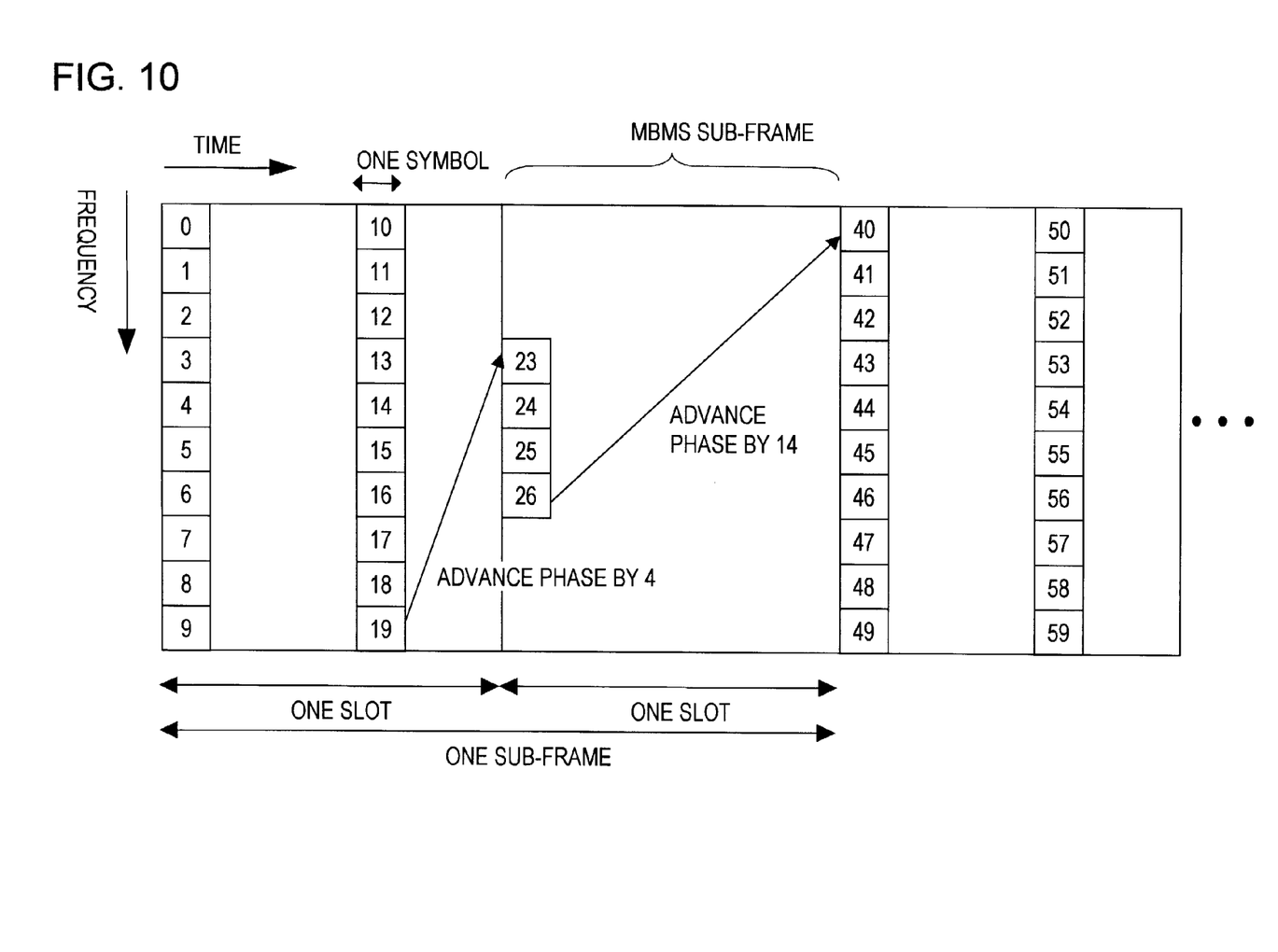
FIG. 10 illustrates a configuration example of a radio frame according to the third embodiment.

FIG. 10 illustrates a configuration example of a radio frame according to the third embodiment. In other words, in the example illustrated in FIG. 10, the sub-frames #0 and #2 are unicast sub-frames, and the sub-frame #1 is an MBMS sub-frame. In the MBMS sub-frame, a cell-specific pilot signal is multiplexed only in the four sub-carriers at the center of the beginning of the sub-frame.

The phase control unit 5 advances the 19th phase of sub-frame #0 by 4, and decides the phase of the first cell-specific pilot signal as 23 in the sub-frame #1. Then the phase control unit 5 advances the 26th phase of the sub-frame #1 by 14, and decides the phase of the first cell-specific pilot signal as 40 in the sub-frame #2. By this, the phases of the cell-specific pilot signals can be continuous in the sub-frames #0, #1 and #2.

Figure 11:
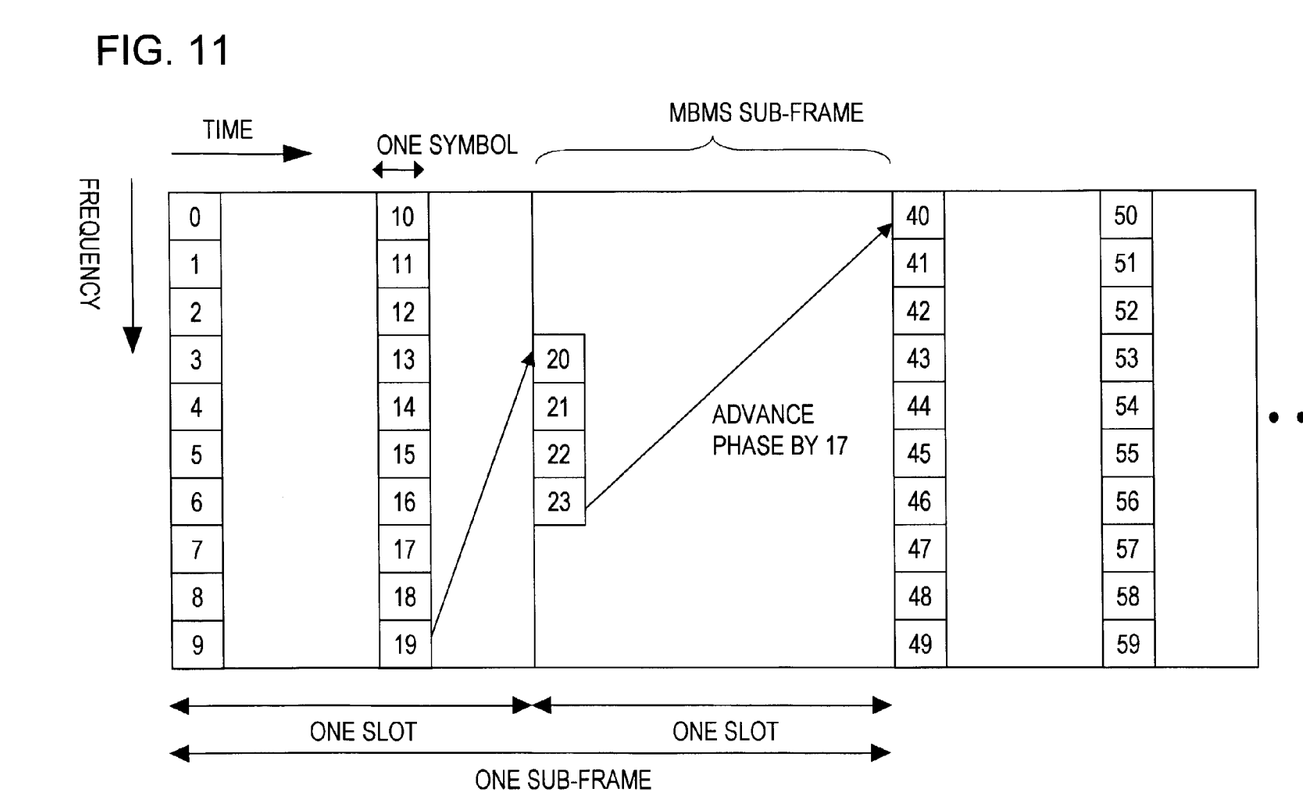
FIG. 11 is another example of a radio frame according to the third embodiment.

FIG. 11 is another example of a radio frame according to the third embodiment. The phase of the first cell-specific pilot signal of the sub-frame #1 is decided as 20, so as to be continuous with the phases of the cell-specific pilot signals in the sub-frame #0. In order to make the sub-frame #1 continue to #2, the phase is controlled so that the $23^{rd}$ phase of the cell-specific pilot signals of the sub-frame #1 is advanced by 17.

What is claimed is:

1. A cell-specific pilot signal transmitting method used in a mobile communication system, which has a base station and a mobile station that performs radio communication with the base station in a cell of a radio communication area formed by the base station, and which mixes, allocates unicast data and broadcast/multicast data to subframes in a radio frame, and transmits the radio frame as downstream data from the base station to the mobile station, the method comprising:

by the base station, multiplexing cell-specific pilot signals to a first subframe to which the unicast data is allocated, while multiplexing cell-specific pilot signals to a second subframe to which the broadcast/multicast data is allocated; and setting a difference between a start phase of a cell-specific pilot signal transmitted in the first subframe in which the base station has transmitted the unicast data and a start phase of a cell-specific pilot signal transmitted in a next subframe to be equal to a difference between a start phase of a cell-specific pilot signal transmitted in the second subframe in which the base station transmitted the broadcast/multicast data and a start phase of a cell-specific pilot signal transmitted in a next subframe, wherein the difference between the start phase of the cell-specific pilot signal transmitted in the first subframe in which the base station has transmitted the unicast data and the start phase of the cell-specific pilot signal transmitted in the second subframe in which the base station has transmitted the broadcast/multicast data is controlled to be a predetermined difference.

2. The method to claim 1, wherein the initial value for a cell-specific pilot signal transmitted in a subframe to which the broadcast/multicast data is allocated to be equal to the initial value for a cell-specific pilot signal transmitted in a subframe to which the unicast data is allocated.

3. A base station that forms a radio communication area for communicating with a mobile station in a mobile communication system that mixes and transmits allocates unicast data and broadcast/multicast data to subframes in a radio frame and transmits the radio frame, the base station comprising:

a multiplexer to multiplex cell-specific pilot signals to a first subframe to which the unicast data is allocated, and to multiplex cell-specific pilot signals to a second subframe to which the broadcast/multicast data is allocated; and a phase control unit to control for setting a difference between a start phase of a cell-specific pilot signal transmitted in the first subframe in which the base station has transmitted the unicast data and a start phase of a cell-specific pilot signal to be transmitted in a next subframe to be equal to a difference between a start phase of a cell-specific pilot signal transmitted in the second subframe in which the base station has transmitted the broadcast/multicast data and a start phase of a cell-specific pilot signal to be transmitted in a next subframe, wherein the difference between the start phase of the cell-specific pilot signal transmitted in a subframe in which the base station has transmitted the unicast data in the first subframe and the start phase of the cell-specific pilot signal transmitted in a subframe in which the base station has transmitted the broadcast/multicast data in the second subframe is controlled to be a predetermined difference.

4. The base station according to claim 3, wherein the initial value for a cell-specific pilot signal transmitted in a subframe to which the broadcast/multicast data is allocated to be equal to the initial value for a cell-specific pilot signal transmitted in a subframe to which the unicast data is allocated.

5. A mobile station that communicates with a base station in a mobile communication system transmitting subframes to which unicast data and broadcast/multicast data are allocated, the mobile station comprising:

a receive unit to receive a cell-specific pilot signal controlled by the base station so that a difference between a start phase of a cell-specific pilot signal transmitted in a first subframe in which the base station transmitted the unicast data and a start phase of a cell-specific pilot signal to be transmitted in a next subframe and a difference between a start phase of a cell-specific pilot signal transmitted in a second subframe in which the base station transmitted the broadcast/multicast data and a start phase of a cell-specific pilot signal to be transmitted in a next subframe are a same predetermined amount, wherein the number of the cell-specific pilot signals to be allocated to the second subframe is different from the number of the cell-specific pilot signals to be allocated to the first subframe, and wherein the difference between the start phase of the cell-specific pilot signal transmitted in a subframe in which the base station has transmitted the unicast data in the first subframe and the start phase of the cell-specific pilot signal transmitted in a subframe in which the base station has transmitted the broadcast/multicast data in the second subframe is controlled to be a predetermined difference.

6. The mobile station according to claim 5, wherein the initial value for a cell-specific pilot signal transmitted in a subframe to which the broadcast/multicast data is allocated to be equal to the initial value for a cell-specific pilot signal transmitted in a subframe to which the unicast data is allocated.

7. A mobile communication system including a base station and a mobile station, in which the base station transmits subframes to which unicast data and broadcast/multicast data are allocated to the mobile station, wherein the base station comprises:

a multiplexer to multiplex cell-specific pilot signals to a first subframe to which the unicast data is allocated, and to multiplex cell-specific pilot signals to a second subframe to which the broadcast/multicast data is allocated; and a phase control unit to control for setting a difference between a start phase of a cell-specific pilot signal transmitted in the first subframe in which the base station transmitted the unicast data and a start phase of a cell-specific pilot signal to be transmitted in a next subframe to be equal to a difference between a start phase of a cell-specific pilot signal transmitted in the second subframe in which the base station transmitted the broadcast/multicast data and a start phase of a cell-specific pilot signal to be transmitted in a next subframe, and wherein the mobile station comprises:

a receive unit to receive the cell-specific pilot signal transmitted from the base station, and wherein the difference between the start phase of the cell-specific pilot signal transmitted in a subframe in which the base station has transmitted the unicast data in the first subframe and the start phase of the cell-specific pilot signal transmitted in a subframe in which the base station has transmitted the broadcast/multicast data in the second subframe is controlled to be a predetermined difference.

8. The mobile communication system according to claim 7, wherein the initial value for a cell-specific pilot signal transmitted in a subframe to which the broadcast/multicast data is allocated to be equal to the initial value for a cell-specific pilot signal transmitted in a subframe to which the unicast data is allocated.

9. The mobile communication system according to claim 7, wherein a cell-specific pilot signal in a sub-frame subframe to which the broadcast/multicast data is allocated is transmitted only in a limited part of the bands, and the phase control unit is constructed so as to advance a phase of a cell-specific pilot signal in the next sub-frame by the amount of phase shift from the limited part of the bands.

* * * * *